Oct. 20, 1959 C. E. ARNTZEN ET AL 2,909,741
ENCASED MAGNETIC CORE IMPREGNATED WITH SILICONE FLUID
Filed Feb. 8, 1954

INVENTORS
Clyde E. Arntzen and
Edward J. Croop.
BY Frederick Shapoe
ATTORNEY

United States Patent Office 2,909,741
Patented Oct. 20, 1959

2,909,741

ENCASED MAGNETIC CORE IMPREGNATED WITH SILICONE FLUID

Clyde E. Arntzen, Turtle Creek, and Edward J. Croop, Pittsburgh, Pa., assignors to Westinghouse Electric Corporation, East Pittsburgh, Pa., a corporation of Pennsylvania Application February 8, 1954, Serial No. 408,718

5 Claims. (Cl. 336—100)

This invention relates to encased magnetic cores impregnated with certain silicone fluids in order to impart shock resistance and to damp vibrations that would set up undesired strains in the magnetic material.

Magnetic cores employed in magnetic amplifiers are prepared from certain selected magnetic alloys which are highly sensitive to strains so that their operating characteristics are impaired if any appreciable strain is introduced into these magnetic cores. It is the common practice to wind thin strips of the magnetic material, usually not exceeding 2 mils in thickness, into a toroidal core about which a number of electrical windings are disposed. The cores of these magnetic amplifiers may be subjected to vibration, shock and other mechanical strains which may introduce considerable stresses into the magnetic cores and thereby alter their characteristics significantly. We have found that it is highly undesirable to fix rigidly these magnetic cores by any mechanical clamps or other holding means since this invariably results in introducing strains with a deterioration of the magnetic characteristics of the core. In many applications, for example in aircraft, the vibration encountered in normal operations may seriously strain the cores and impair their response. It is a serious problem in the industry to prepare magnetic core structures that will be relatively insensitive to vibration, shocks and the like over a range of temperatures that will reasonably vary from $-65°$ C. to over $110°$ C.

An object of this invention is to provide a completely encased magnetic core disposed freely in a non-magnetic enclosure and impregnated with a certain selected silicone fluid to minimize vibration and shock strains over the range of temperatures to which such cores may be exposed.

A further object of the invention is to provide for dampening encased magnetic cores of a strain sensitive material by impregnating the cores with a phenyl methyl silicone liquid of a viscosity of from 50 to 40,000 centistokes.

Other objects of the invention will, in part, be obvious and will, in part, appear hereinafter.

For a better understanding of the nature and objects of this invention, reference should be had to the following detailed description and drawing, in which.

We have discovered that magnetic cores of highly strain sensitive materials may be disposed freely within non-magnetic enclosures and impregnated with certain fluid phenyl methyl silicone to minimize strain set up by shock, vibration and the like over a range of temperatures from $-65°$ C. to $110°$ C. Briefly, the magnetic cores are formed of a suitable magnetic material comprising highly oriented nickel-iron alloys wherein the iron and nickel are in nearly equal proportions, or the alloy comprising between 75% to 85% nickel, between 2% and 7% molybdenum, up to 2% manganese and the remainder iron, as disclosed in Patent 2,631,118, and similar alloys. These alloys are produced in the form of thin sheets of not over 2 mils thickness and may be as thin as ⅛ mil or less. These thin sheets of magnetic material in the oriented state are wound into a toroidal core and then annealed to free them from any strains that may have been imparted during the winding operation. Thereafter, the wound toroidal core is then placed within an enclosure in the shape of a toroidal box in which the core is freely disposed with a clearance between the walls of the enclosure and the core whereby to prevent binding of the magnetic core. Thereafter, the box is filled with a fluid phenyl methyl silicone having a viscosity of from 50 to 40,000 centistokes at 25° C. The enclosure is then sealed, thereby resulting in a core that will withstand any reasonably expected conditions of shock, vibration or temperature change.

Figure 1:
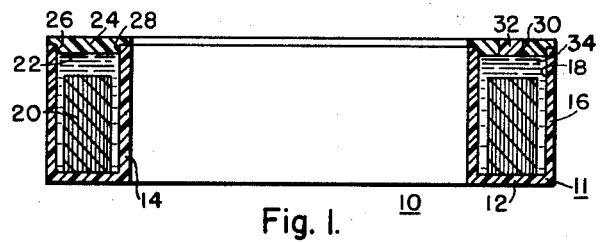
Fig. 1 is a cross section through an encased magnetic core.

Referring to Fig. 1 of the drawing, there is illustrated an encased toroidal magnetic core unit 10 comprising a resinous toroidal casing 11 of a trough-like cross-section, having a bottom wall 12, a vertical inside wall 14 and a vertical outside wall 16, forming an annular chamber 18. A fully annealed toroidal core 20 comprising a plurality of turns of highly strain sensitive magnetic material is disposed within the chamber 18. It will be noted that the core 20 is free within the chamber 18 and is not fastened or otherwise attached to any of the walls thereof, there being a substantial clearance between the core 20 and the walls 14 and 16 permitting relative movement and allowing relative expansion and contraction to take place without the core being bound at any time.

The toroidal trough casing 11 with the magnetic core 20 therein is covered with a ring-shaped cover 24 which has square shoulders 26 and 28 fitting the upper edges of walls 14 and 16. An adhesive is applied at the shoulders 26 and 28 to provide for holding the cover 24 in place and to seal the chamber 18. The cover 24 is provided with an aperture 30 of a size to enable an impregnating liquid to be introduced into the chamber 18. The aperture 30 is closed with a sealed plug 32 after the impregnating fluid has been introduced. The covered toroidal casing 11 with the magnetic core disposed therein is evacuated and impregnated with a phenyl methyl silicone fluid 34 through the aperture 30 in order to thoroughly fill all of the interlaminar spaces of the core and to fill the entire casing.

Figure 2:
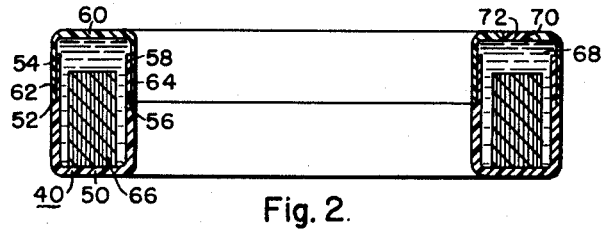
Fig. 2 is a vertical cross section through a modified form of enclosure.

It will be appreciated that other shapes of enclosures may be employed than that shown. As illustrated in Fig. 2, the casing 40 comprises a toroidal lower half 50 having an outer circumferential shoulder 52 and a vertical ledge 54 and an inner circumferential shoulder 56 and a second vertical ledge 58. A toroidal cover 60, with an outer flange 62 and an inner flange 64 fit over the ledges 54 and 58 and resting on the shoulders 52 and 56, is sealed with a suitable cement to the toroidal half 50. A magnetic core 66 is disposed with the toroidal lower half 50 and cover 60. A phenyl methyl siloxane fluid 68 is introduced by vacuum impregnation through aperture 70 in the cover 60, said aperture being sealed with a cemented plug 72.

For the purpose of this invention, we have found that known methyl silicones are not satisfactory for the purpose of the invention. Only the phenyl methyl silicones having from 1 to 20 mol percent of phenyl groups based on the total number of phenyl and methyl groups are satisfactory for the purpose of this invention. We have secured the best results with phenyl methyl silicones having a viscosity of from 1,000 to 30,000 centistokes at 25° C. By adding up to 15% of their weight of silica aerogel of an average particle size of mil and less, phenyl methyl silicones of from 50 to 1,000 centistokes are equally effective as such higher viscosity fluids. It will be understood that 15% of solids is used with the 50 to 100 centistoke fluids, and lesser amounts of solids up to 1% or less for 1,000 centistoke phenyl methyl silicones. Such compositions are superior to any known petroleum oil, liquid polyesters, fluorinated oils, polyisobutylene and other liquid polymers.

The enclosures 11 and 24, and 50 and 60 have been prepared from nylon molding composition with highly satisfactory results. However, these enclosures may be prepared from other thermoplastic or thermoset resins, such as ethyl cellulose, cellulose acetate, melamine resins and the like. Suitable adhesives or cements are solutions of nylon in a solvent, epoxy resins, etc.

Figure 3:
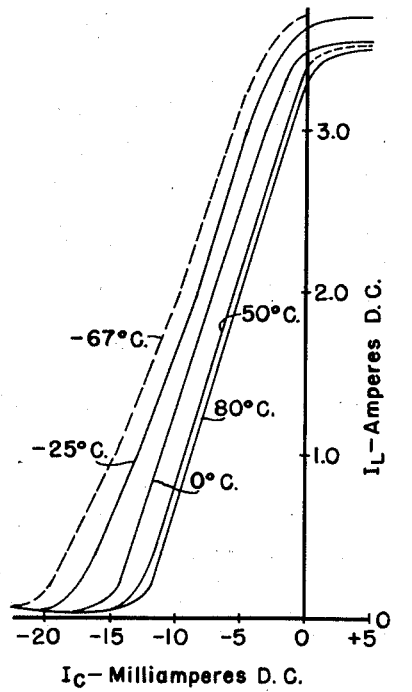
Fig. 3 is a graph plotting the induced voltage against control ampere turns for a magnetic core, such as in Fig. 1.

Referring to Fig. 3 of the drawing, there are illustrated tests run on the same magnetic core associated with the same control windings and disposed in an enclosure, the test being run prior to impregnation with the phenyl methyl silicone and then repeated after impregnation with a phenyl methyl silicone fluid of 17,600 centistokes viscosity at 25° C. These tests were run at five temperatures from 80° C. to −67° C., as indicated on the graph. The indicated control current being in milliamperes ($I_C$) with the output current $I_L$ being in amperes. It will be noted that the points resulting from the tests under both conditions are substantially identical, thereby indicating that there is no change in characteristics of the magnetic core as a result of the impregnant. Similar identity of curves was obtained when the magnetic cores were impregnated with phenyl methyl silicones of a viscosity of 5,000, 17,600, 25,000, and 35,000 centistokes at 25° C. as well as 50 centistoke fluids with 10% silica aerogel.

The cores were subjected to extensive vibration over a wide range of frequencies and amplitudes. It was found that the presence of the phenyl methyl silicone fluid within the enclosures effectively dampened out the vibration over the entire range of temperatures of from −65° C. to 110° C. With fluids that had a viscosity of less than 50 centistokes, the vibration produced erratic results. When a fluid had a viscosity of more than 50 centistokes, the operation was normal. Optimum dampening was obtained in fluids of 1,000 centistokes to 30,000 centistokes over the range of temperatures of 110° C. to −65° C.

It will be understood that the above description is exemplary and not limiting.

We claim as our invention:

1. In an encased magnetic core suitable for effective use at temperatures of from above 100° C. to −65° C., in combination, a sealed non-magnetic enclosure consisting of an electrically insulating material, having walls forming a toroidal chamber, a toroidally wound magnetic core comprising a magnetic material highly sensitive to strains, including strains induced by vibration, disposed within the toroidal chamber in the sealed enclosure, the turns of the core being free and not bonded to one another, the magnetic core being freely disposed with a clearance between the walls of the enclosure and the magnetic core, and a silicone oil filling the sealed enclosure, the silicone oil having a viscosity of from 50 to 40,000 centistokes at 25° C. and serving to dampen the magnetic core, thereby eliminating strains therefrom, the silicone oil composed of a phenyl methyl silicone wherein the phenyl groups comprise from 1 to 20 mol percent of the total phenyl and methyl groups, the oils of a viscosity of from 50 to 1,000 centistokes being admixed with from 15% to 1%, based on the weight of the oil of a finely divided filler of an average particle size of less than one micron, the largest amounts of filler being admixed with the lowest viscosity oils.

2. The encased magnetic core of claim 1, wherein the silicone oil has a viscosity of from 1,000 to 30,000 centistokes at 25° C.

3. The encased magnetic core of claim 1 wherein the magnetic core comprises strips of an alloy comprising substantially equal parts of nickel and iron.

4. The encased magnetic core of claim 1, wherein the enclosure comprises molded nylon.

5. In an encased magnetic core suitable for effective use at temperatures of from above 100° C. to −65° C., in combination, a sealed non-magnetic enclosure consisting of an electrically insulating material, having walls forming a toroidal chamber, a toroidally wound magnetic core comprising a magnetic material highly sensitive to strains, including strains induced by vibration, disposed within the toroidal chamber in the sealed enclosure, the turns of the core being free and not bonded to one another, the magnetic core being freely disposed with a clearance between the walls of the enclosure and the magnetic core, and a silicone oil composition filling the sealed enclosure to dampen the magnetic core, the composition composed of a phenyl methyl silicone oil of a viscosity of from 50 to 1,000 centistokes at 25° C. and up to 15% by weight, based on the weight of the oil, of a finely divided filler of an average particle size of less than 1 micron, the maximum amount of filler being used with the lowest viscosity oils and not exceeding about 1% for the 1,000 centistoke oil, the phenyl methyl silicone oil having phenyl groups amounting to from 1 to 20 mol percent of the total of phenyl and methyl groups.

References Cited in the file of this patent

UNITED STATES PATENTS

| | | |
|---|---|---|
| 2,384,384 | McGregor | Sept. 4, 1945 |
| 2,569,468 | Gaugler | Oct. 2, 1951 |
| 2,592,721 | Mott | Apr. 15, 1952 |
| 2,696,592 | Petroff | Dec. 7, 1954 |

OTHER REFERENCES

Dow Corning Silicone Note Book, Fluid Series #3, issued September 1948, particularly pages 4, 5, 14 and 15.

"Performance, Guaranteed Tape Wound Cores," particularly pages 2 and 3, catalogue TWC–100, by Magnetics Inc., February 1954.